(12) United States Patent
Kemper

(10) Patent No.: US 12,287,148 B2
(45) Date of Patent: Apr. 29, 2025

(54) PLATE CONVEYOR BELT FOR TRANSPORTING A MATERIAL WEB WHICH IS TO BE CONTINUOUSLY THERMALLY TREATED USING A GASEOUS TEMPERING MEDIUM, AND FURNACE COMPRISING AT LEAST ONE PLATE CONVEYOR BELT

(71) Applicant: BERND MÜNSTERMANN GMBH & CO. KG, Telgte (DE)

(72) Inventor: Wilfred Kemper, Ladbergen (DE)

(73) Assignee: BERND MÜNSTERMANN GMBH & CO. KG, Telgte (DE)

( * ) Notice: Subject to any disclaimer, the term of this patent is extended or adjusted under 35 U.S.C. 154(b) by 349 days.

(21) Appl. No.: 17/798,400

(22) PCT Filed: Feb. 9, 2021

(86) PCT No.: PCT/EP2021/053035
§ 371 (c)(1),
(2) Date: Aug. 9, 2022

(87) PCT Pub. No.: WO2021/160586
PCT Pub. Date: Aug. 19, 2021

(65) Prior Publication Data
US 2023/0096050 A1    Mar. 30, 2023

(30) Foreign Application Priority Data
Feb. 11, 2020  (DE) .......................... 102020103449.0

(51) Int. Cl.
*B65G 17/06*    (2006.01)
*B65G 17/34*    (2006.01)
(Continued)

(52) U.S. Cl.
CPC ............ *F27B 9/243* (2013.01); *B65G 17/065* (2013.01); *B65G 17/34* (2013.01); *F27B 9/10* (2013.01)

(58) Field of Classification Search
CPC ........ C21D 9/54; C21D 9/56; C21D 2221/01; C21D 2221/02; C21D 2221/10;
(Continued)

(56) References Cited

U.S. PATENT DOCUMENTS

| 4,542,821 A | 9/1985 | Livermore |
| 5,238,399 A * | 8/1993 | Long .................. F26B 3/082 432/143 |

(Continued)

FOREIGN PATENT DOCUMENTS

| DE | 102019113037 A1 * | 11/2020 | ............. B65G 17/08 |
| EP | 0619465 A1 | 10/1994 | |
| WO | 2014057170 A1 | 4/2014 | |

OTHER PUBLICATIONS

International Search Report; priority document.

*Primary Examiner* — Gregory A Wilson
(74) *Attorney, Agent, or Firm* — Greer, Burns & Crain, Ltd.

(57) ABSTRACT

A plate conveyor belt, and a furnace with such a conveyor belt, for transporting a material web which is to be continuously thermally treated using a gaseous tempering medium. The plate conveyor belt includes conveyor belt segments connected together in an articulated manner and each of which has a flat cover plate with a contact surface for the material web to be treated. The cover plate has openings for conducting the gaseous tempering medium, which can be conducted through the material web. The openings in the cover plate are arranged corresponding to the transport of the material web which is as wide as possible, and edge-side openings of the cover plate at least along a longitudinal face (Continued)

of the plate conveyor belt can be blocked from conducting the tempering medium via a wall-shaped blocking element in order to thermally treat a narrower material web.

17 Claims, 6 Drawing Sheets

(51) Int. Cl.
*F27B 9/10* (2006.01)
*F27B 9/24* (2006.01)

(58) Field of Classification Search
CPC .... F27B 9/28; F27B 9/243; F27B 9/10; F27B 2009/3016; F27D 2003/21; F27D 7/04; B65G 17/065
See application file for complete search history.

(56) References Cited

U.S. PATENT DOCUMENTS

| | | | | |
|---|---|---|---|---|
| 5,319,862 | A * | 6/1994 | Ohgihara | F27D 99/0073 266/179 |
| 5,581,907 | A * | 12/1996 | Kuma | F26B 15/18 34/388 |
| 6,523,673 | B1 | 2/2003 | Fenton, Jr. | |
| 8,162,134 | B2 * | 4/2012 | Krause | B65G 17/08 198/779 |
| 8,816,253 | B2 * | 8/2014 | Parks | H01L 21/67173 219/390 |
| 2013/0034821 | A1 | 2/2013 | Lopez et al. | |
| 2018/0177199 | A1 * | 6/2018 | Pitlor | A21B 1/26 |

\* cited by examiner

PLATE CONVEYOR BELT FOR TRANSPORTING A MATERIAL WEB WHICH IS TO BE CONTINUOUSLY THERMALLY TREATED USING A GASEOUS TEMPERING MEDIUM, AND FURNACE COMPRISING AT LEAST ONE PLATE CONVEYOR BELT

CROSS-REFERENCES TO RELATED APPLICATIONS

This application claims the benefit of the International Application No. PCT/EP2021/053035, filed on Feb. 9, 2021, and of the German patent application No. 102020103449.0 filed on Feb. 11, 2020, the entire disclosures of which are incorporated herein by way of reference.

FIELD OF THE INVENTION

The present invention relates to a plate conveyor belt for transporting a material web that is to be thermally treated in a continuous flow by a gaseous tempering medium, in particular for transporting a mineral wool web that contains binders and can be thermally cured by a gaseous heating medium through a curing furnace, the plate conveyor belt being made up of conveyor belt segments connected to one another in articulated fashion, each having a flat cover plate having a surface that forms a contact surface to the material web to be treated, and the cover plate having openings for conducting through the gaseous tempering medium, which is capable of being conducted through the material web. In addition, the present invention relates to a furnace for a material web to be thermally treated in a continuous flow by a gaseous tempering medium, in particular for a mineral wool web containing thermally curable binders, having at least one plate conveyor belt for transporting the material web.

BACKGROUND OF THE INVENTION

EP 619 465 B1 describes a device for producing a mat for building purposes, comprising a conveying mechanism for conveying a mat, the conveying mechanism comprising two conveyors, an upper one and a lower one, each conveyor comprising two endless chains extending over sprockets. A multiplicity of crawler plates having perforated ventilation openings are mounted thereon, extending over the chain pair. The mat is conveyed by being held between the two conveyors. In addition, the device comprises a heating and blowing mechanism for heating the mat in order to dry/cure it while it is conveyed by the upper and lower conveyors and is accommodated in a furnace. The heating and blowing mechanism comprises blower boxes that are situated in the furnace at locations above and below the crawler plates of the respective forward runs of the upper and lower conveyors, so that hot air from a heating source is supplied by one of the blower boxes, which air flows through the crawler plates of the respective forward runs and through the mat, which is conveyed into another blower box in order to achieve drying/curing of the mat. The device further includes a shielding mechanism that comprises sealing elements that are situated between the crawler plates of the respective forward runs and the heating and blowing mechanism in order to prevent leakage of the hot air. The shielding mechanism comprises stationary sealing elements that are configured so as to abut the lateral sides of the crawler plates of the respective forward runs and that extend around the blower boxes along the conveying direction. A further component of the device is a movable flexible sealing element that is configured so as to be inwardly directed from the stationary sealing elements and that extends along the conveying direction and is movable against and by a counter-bearing against the crawler plates of the forward runs, and a selection mechanism for the shielded width for operating the movable flexible sealing element for movement against and away from a counter-bearing against the crawler plates of the forward runs, in order to provide a modifiable shielded width, thus permitting a drying/curing of the mat in a selectable effective width.

In this known device, it is essential that the shielding mechanism comprises a multiplicity of rows of movable flexible sealing elements that are situated, directed inwardly from the stationary sealing elements, at different crosswise positions, and that extend along the conveying direction and are movable against and away from a counter-bearing against the crawler plates of the forward runs, the selection mechanism for the shielded width being operable so as to bring about an independent operation of the multiplicity of rows of movable flexible sealing elements, and a shielded width being determined by stationary and movable sealing elements that abut the crawler plates of the forward runs at innermost positions.

Preferably, here wire brushes are used as flexible sealing elements that at the same time also act as filters for dust, and for this purpose must have a certain degree of permeability to gas or air, which disadvantageously results in leakage flows of the gaseous tempering medium, and associated energy losses. In addition, the known device is clearly technically very complicated.

Therefore, for the present invention the task arises of providing a plate conveyor belt of the type named above that avoids the disadvantages of the existing art and in which, with a low technical outlay, in particular leakage flows of the gaseous tempering medium and the associated energy losses in the thermal treatment of material webs having different widths are prevented, or at least reduced. In addition, a correspondingly improved furnace is to be indicated.

SUMMARY OF THE INVENTION

The solution of the part of the object relating to the plate conveyor belt is achieved according to the present invention by a plate conveyor belt of the type named above that is characterized in that the openings in the cover plate are made in a configuration corresponding to the transporting of a widest possible material web, and that for the thermal treatment of a narrower material web edge-side openings of the cover plates can be shut off, with regard to the conducting through of the gaseous tempering medium, by at least one wall-shaped blocking element that is not permeable to gas.

Due to the use of the wall-shaped gas-impermeable blocking element, the present invention advantageously brings it about that leakage flows of the gaseous tempering medium, such as hot air, are prevented to the greatest possible extent, resulting in improved energy efficiency in the thermal treatment of the material web. Leakage flows in the treatment of a material web that is narrower than the maximum possible material web width for the plate conveyor belt through openings in the cover plate not covered by the material web, as well as leakage flows through the blocking element itself, are prevented or at least effectively reduced. In the plate conveyor belt according to the present invention, a filtering function of the blocking element is omitted, but, with regard to current energy costs and efforts to save energy, the increase in energy efficiency exceeds the disadvantage due to the omission of the filtering function of the blocking element. In addition, it is easily possible, if necessary, to install a filter device as a separate component, to be provided only as needed, of the plate conveyor belt at a suitable location of the plate conveyor belt.

In addition, according to the present invention it is preferably provided that along both longitudinal sides of the plate conveyor belt, edge-side through-openings of the cover plates are capable of being blocked and opened with regard to the conducting through of the gaseous tempering medium, in accordance with the width of the material web to be thermally treated, by at least one wall-shaped blocking element in each case. In this way, the material web can always lie centrically on the plate conveyor belt, which is favorable, e.g., for a uniform thermal input over the width of the material web. Thus, in principle, with the plate conveyor belt realized in this way, material webs having different widths can be transported and treated, and the number of different widths can vary practically as needed, depending on the client's requirements.

A development of the plate conveyor belt provides that on each conveyor belt segment, on its side facing away from the contact surface, three or more partition walls running in the longitudinal direction of the plate conveyor belt are situated at the left and at the right in each case, and that at least two edge-side pairs of partition walls adjacent to one another are assigned a shutoff device having the wall-shaped blocking element, which is adjustable between a shutoff position and two or more opening positions for the gaseous tempering medium to be fed between the associated adjacent partition walls through the openings, situated between these partition walls, in the cover plates. The partition walls are usefully situated so as to be substantially congruent with the edges of the material webs of different widths to be transported on the plate conveyor belt. Depending on the width of the material web currently to be transported and treated, all or fewer gaps between adjacent partition walls are then opened for the conducting through of the gaseous tempering medium.

In principle, the blocking element or blocking elements can each be situated on the conveyor belt segments, and can circulate with them.

Preferably, however, the present invention provides that the shutoff device having the at least one blocking element adjustable between the shutoff position and the open position is situated in stationary fashion, and that at least in the shutoff position of the wall-shaped blocking element, the partition walls that cooperate with the shutoff device run over sliding surfaces of the shutoff device in sealing fashion during operation of the plate conveyor belt. In this way, in particular a low outlay of components is achieved, because one or more blocking elements are required only over a section of the plate conveyor belt through which the gaseous tempering medium flows during operation of the plate conveyor belt.

In a further embodiment of the plate conveyor belt, it is provided that sealing strips having the sliding surfaces and running in the longitudinal direction of the plate conveyor belt are positioned in the shutoff device, opposite the partition walls, over which strips the partition walls slide in sealing fashion during operation of the plate conveyor belt. For these sealing strips, for example materials based on calcium silicates are well-suited, because they can withstand the high temperatures of up to approximately 300° C. or more that occur during operation of the plate conveyor belt during a thermal treatment of material webs such as insulating mats.

In order to avoid disruptive gaps, permeable to the gaseous tempering medium, between the blocking elements and the partition walls, the distance of the shutoff device relative to the partition walls can usefully be adjusted and readjusted.

Preferably, the shutoff device has at least one supporting frame having tempering medium guide walls, which frame bears the sealing strips on its side facing the partition walls and whose side facing away from the partition walls cooperates with the wall-shaped blocking element or elements. This provides good flow guidance for the gaseous tempering medium and a favorable component configuration for the shutoff device.

To prevent undesirable leakage flows of the gaseous tempering medium through gaps between the wall-shaped blocking element and the supporting frame, it is proposed that the position of the/each wall-shaped blocking element relative to the supporting frame can be adjusted and readjusted.

A further measure to prevent undesirable leakage flows of the tempering medium is that sealing lips are preferably situated on the side of the supporting frame that cooperates with the wall-shaped blocking element or elements, which lips, in the shutoff position of the wall-shaped blocking element or elements, seal it/them against the supporting frame. If high temperatures occur during operation of the plate conveyor belt, the sealing lips are preferably designed as sheet metal strips, for example made of spring steel, which can easily be brought into a shape, in particular a curved shape, that is adapted to the sealing purpose, and which are suitable for compensating dimensional tolerances, and are at the same time heat-resistant.

Further, the present invention provides that the/each wall-shaped blocking element is adjustable manually or by a, or a respective, power drive. The choice of the type of adjustment depends, for example, on the convenience requirements of the user of the plate conveyor belt and/or on the expected frequency of adjustment of the blocking elements during the use of the plate conveyor belt.

The wall-shaped blocking element can be, for example, a flat plate that can be displaced in its plane or can be pivoted about a pivot axis. Preferably, however, the/each wall-shaped blocking element has the shape of a cylinder jacket segment and can be pivoted in the manner of a rotary slide about its imaginary cylinder center axis, as a pivot axis running in the longitudinal direction of the plate conveyor belt, between its shutoff position and one or more opening positions.

Since the circulating plate conveyor belt is made up of conveyor belt segments connected to each other in the manner of a crawler track and is deflected by 180° at its end regions, the partition walls of the individual conveyor belt segments must not obstruct the deflection. On the other hand, however, the partition walls of adjacent conveyor belt segments should adjoin each other as tightly as possible in the areas outside the deflections, in order to prevent leakage of tempering medium there. For this purpose, the present invention provides that adjoining partition walls of successive conveyor belt segments are realized with overlapping end sections.

Finally, for the plate conveyor belt, the present invention provides that the openings in the cover plates are in the form of round holes and/or elongated slots. Such openings are easy to manufacture and provide a favorable distribution of the gaseous tempering medium in the material web to be thermally treated.

To solve the second part of the problem stated above, a furnace is proposed for a material web to be treated in a continuous flow by a gaseous tempering medium, in particular for a mineral wool web containing thermally curable binders, having at least one plate conveyor belt for transporting the material web.

With the furnace according to the present invention, the advantages explained above in connection with the plate conveyor belt are also achieved with regard to the furnace as a whole.

In a further development of the furnace, it is provided that it has two plate conveyor belts running parallel to one another at a distance, their cover plates facing one another in the conveyor belt strands accommodating the material web between them, and their distance being set or adjustable to a dimension corresponding to the desired thickness of the material web.

In addition to a furnace, the plate conveyor belt according to the present invention can also be used in a cooling section, for example downstream from a furnace, a gaseous cooling medium then flowing through the openings in the cover plates and through the material web transported thereby.

BRIEF DESCRIPTION OF THE DRAWINGS

In the following, an exemplary embodiment of the present invention is explained with reference to a drawing.

In the following description of the Figures, identical parts in the various Figures are always provided with the same reference characters, so that it is not necessary to explain all the reference characters again for each Figure.

DETAILED DESCRIPTION OF THE PREFERRED EMBODIMENTS

Figure 1:
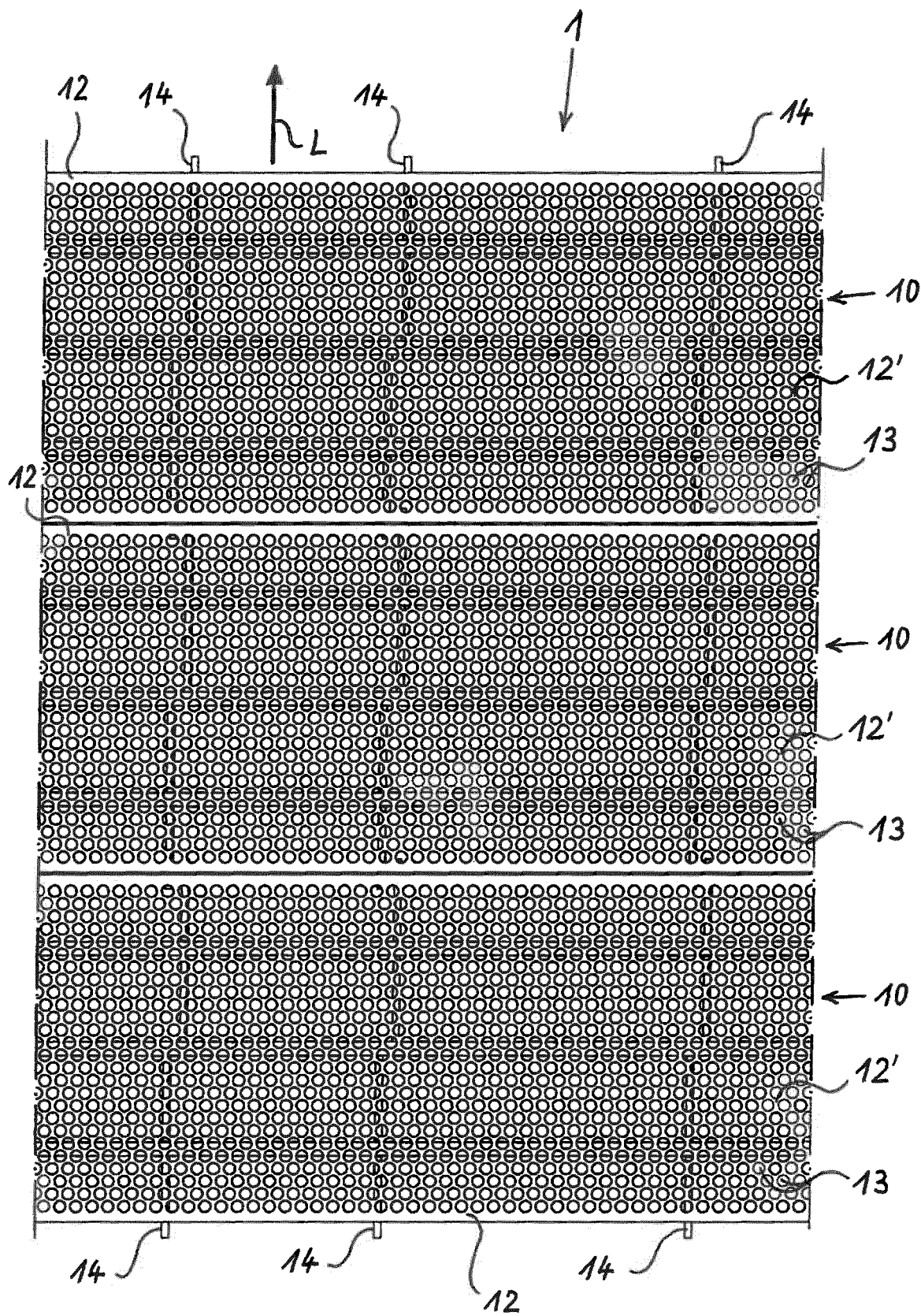
FIG. 1 shows a portion of a plate conveyor belt, in a plan view.

FIG. 1 shows a portion of a plate conveyor belt 1 in a plan view.

Plate conveyor belt 1 is made up of a multiplicity of conveyor belt segments 10 that are connected to one another in an articulated manner in the manner of a crawler chain, each having an elongated rectangular outline. The longitudinal direction of conveyor belt segments 10 here runs in the transverse direction of plate conveyor belt 1, i.e., perpendicular to the direction of travel L. Plate conveyor belt 1 has a conveying strand, which is visible in FIG. 1, and a return strand, which is not visible in FIG. 1, and is deflected at its ends by deflection and/or drive drums (not shown in the drawing), as is known per se.

The side of the conveyor belt segments 10 facing the observer in FIG. 1 is in each case formed by a cover plate 12 in which a multiplicity of openings 13 are made. The openings 13 are used to conduct a gaseous tempering medium, such as hot air, through cover plates 12 and through a material web (not shown) that lies on cover plates 12 and is transported by plate conveyor belt 1.

The material web can be, for example, a mineral insulating material web having a binder contained therein, to be thermally cured in a curing furnace in a continuous flow.

In order to be able to transport and treat material webs of different widths with plate conveyor 1 without unnecessary energy losses occurring as a result of tempering medium flowing through openings 13 not covered by the material web, openings 13 situated in the lateral edge regions 12' of cover plate 12 can be shut off, as needed, against a tempering medium flow by a shutoff device situated under conveyor belt segments 10, which device is concealed and therefore not visible in FIG. 1.

In adaptation to material webs of different widths to be transported, in order to form different regions capable of being shut off of the cover plates 12 provided with openings 13, a plurality of partition walls 14 are situated on the underside of said cover plates, each running in the longitudinal direction, i.e., in the conveying direction L, of plate conveyor belt 1 and oriented perpendicularly to the surface of cover plate 12, which walls cooperate with the shutoff device described below.

Figure 2:
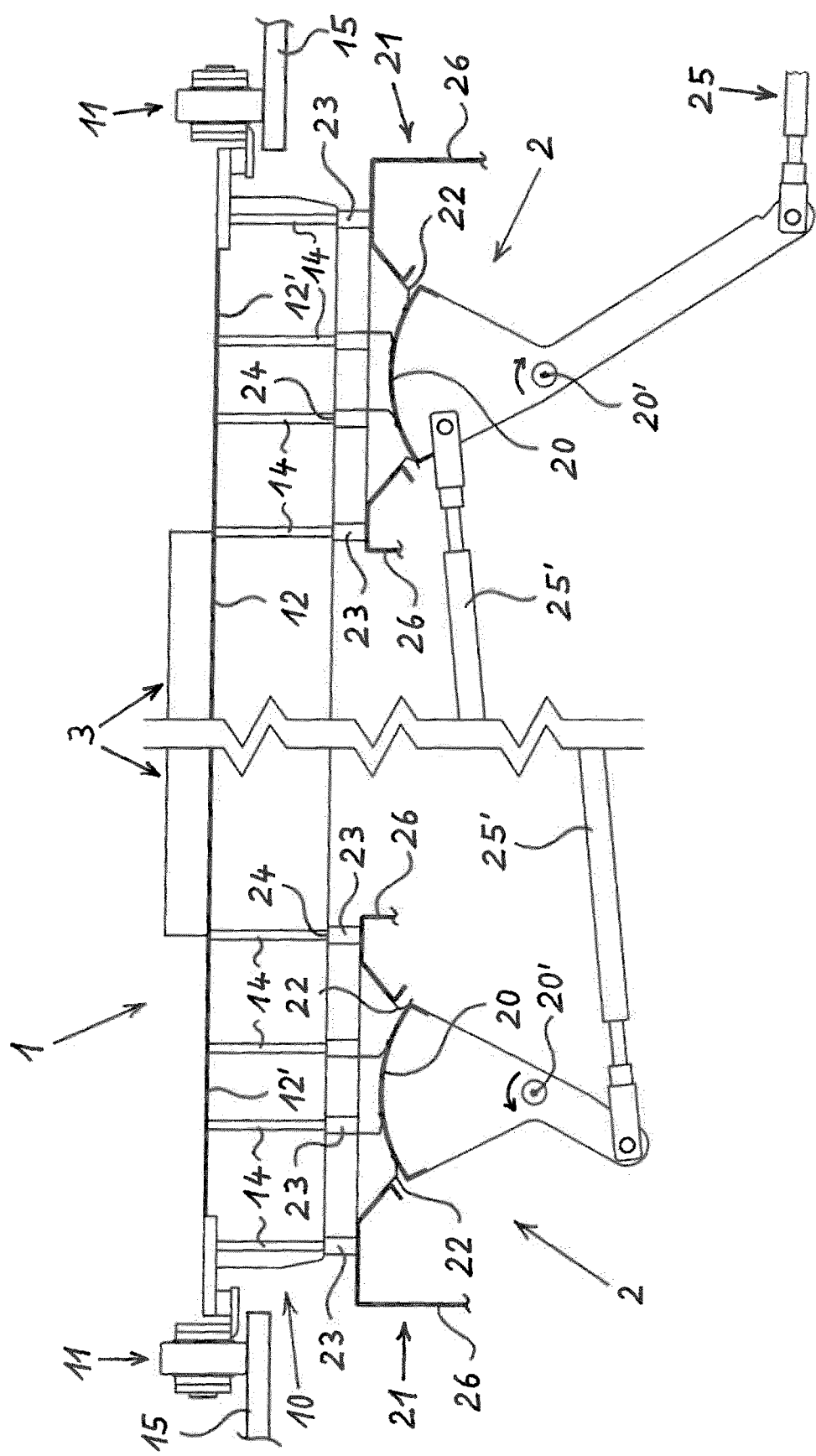
FIG. 2 shows the plate conveyor belt in a first operating state, in a schematic cross-section.

FIG. 2 shows plate conveyor belt 1 in a first operating state in a schematic cross-section; in FIG. 2 the two lateral edge regions of plate conveyor belt 1 are shown, and a central part of plate conveyor belt that is not relevant for the explanation of the present invention is not shown.

At the top of FIG. 2, a conveyor belt segment 10 of plate conveyor belt 1 is visible. The upper side of conveyor belt segment 10 is formed by cover plate 12 with its two lateral edge areas 12'. The openings 13 in cover plate 12 explained in FIG. 1 are not visible in FIG. 2 due to the scale of FIG. 2, but are of course present.

Conveyor belt segments 10 adjacent to one another are connected to one another in the manner of crawler tracks by articulated connections 11 and are supported and guided so as to be capable of movement on a conveyor belt frame 15, which is only indicated here.

The surface of cover plate 12 forms a contact surface with a material web 3 lying thereon that is to be transported and treated. The treatment of material web 3 consists, for example, in its heating by a hot gaseous tempering medium, such as hot air, which is supplied, usefully in a circuit, from the underside of plate conveyor belt 1 and is conducted into and through material web 3 through openings 13 in cover plates 12. The direction of flow can also run in the opposite direction or can be varied during operation.

As FIG. 2 illustrates, material web 3 to be transported and treated here has a width, measured in the plane of the drawing, that is smaller than the width of plate conveyor belt 1 measured in the same direction. In order to ensure that the entire flow of the gaseous tempering medium flows through material web 3 and not past it, plate conveyor belt 1 is assigned shutoff device 2, shown below conveyor belt segment 10 in FIG. 2. This shutoff device 2 can shut off tempering medium flows through lateral edge areas 12' of cover plate 12 that are not occupied by material web 3.

For this purpose, on each conveyor belt segment 10, on the underside of cover plate 12 facing away from the upper-side contact surface, four partition walls 14 are situated at the left and right in each case in the longitudinal direction, i.e., in the direction of travel, of plate conveyor belt 1, i.e., here perpendicular to the plane of the drawing, and are attached for example by screwed or welded connections.

Each of the two edge-side configurations of partition walls 14 is assigned a respective stationary shutoff device 2 having a wall-shaped blocking element 20. Wall-shaped blocking element 20 is adjustable between a shutoff position and a plurality of open positions for the gaseous tempering medium to be fed between the associated, mutually adjacent partition walls 14, through the openings 13, lying between these partition walls 14, in cover plate 12.

Shutoff devices 2 are situated on a stationary supporting frame 21 (shown only partially in FIG. 2) having tempering medium guide walls 26. Sealing strips 23, each having an upper-side sliding surface 24, are situated on the upper side of supporting frame 21 opposite partition walls 14. During operation of plate conveyor belt 1, the undersides of partition walls 14 slide over sliding surfaces 24 in as gas-tight a manner as possible.

A sealing lip 22 is assigned to the underside of each sealing strip 23. Sealing lips 22 cooperate with a wall-shaped blocking element 20 of shutoff device 2, which element has the shape of a cylinder jacket segment. Blocking element 20 can be pivoted in the manner of a rotary slide about a pivot axis 20' extending perpendicular to the drawing plane of FIG. 2. A power drive 25, for example a linear motor or a piston-cylinder unit, is used for this purpose, the two blocking elements 20 being coupled to one another in terms of movement in opposite directions by a coupling rod 45'.

In the operating state shown in FIG. 2, wall-shaped blocking elements 20 are each in contact with all four sealing lips 22, so that, at both longitudinal edges of plate conveyor belt 1, the gaseous tempering medium cannot flow through the gaps between the respectively mutually adjacent partition walls 14. In this operating state, shutoff device 2 is in its shutoff position and thus blocks a flow of tempering medium through all the edge-side flow paths bounded by the partition walls 14, and a tempering medium flow can take place here only through the central region of cover plate 12, which region is occupied by material web 3 and cannot be influenced by shutoff devices 2. Leakage flows, which result in energy losses, of the gaseous tempering medium past material web 3, which has a smaller width than plate conveyor belt 1, are therefore prevented.

Figure 3:
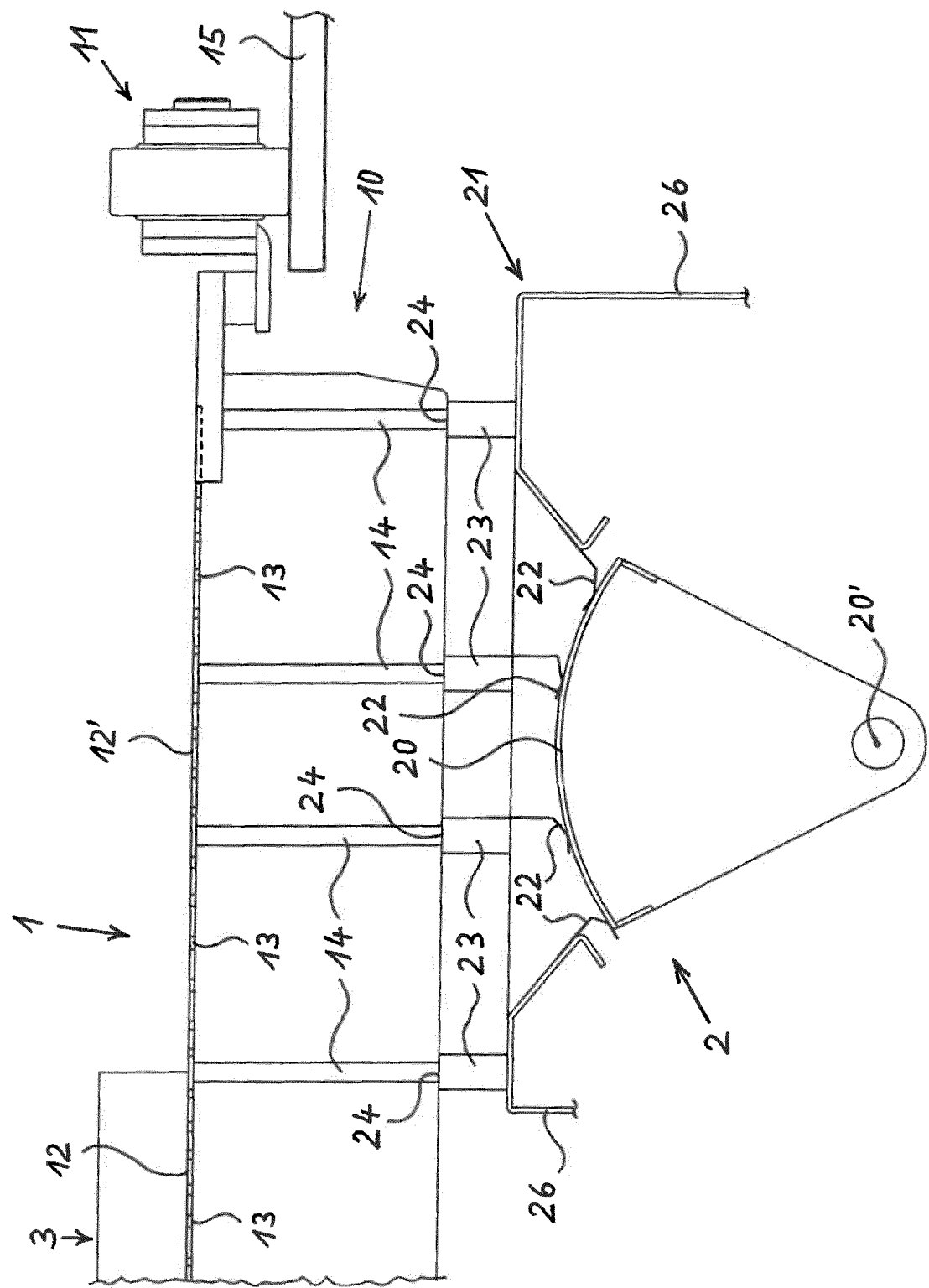
FIG. 3 shows the plate conveyor belt in the first operating state, in an enlarged schematic partial cross-section.

FIG. 3 shows plate conveyor belt 1, again in the first operating state, here in an enlarged schematic partial cross-section through the right edge region of plate conveyor belt 1 in FIG. 2.

At the top in FIG. 3, a part of conveyor belt segment 10 is visible, with cover plate 12 having openings 13 and its edge region 12'. Below edge region 12' of cover plate 12, partition walls 14 are situated on the cover plate. At far right in FIG. 3, one of the articulated connections 11 between adjacent conveyor belt segments 10 is visible. At the top left, on cover plate 12 a part of material web 3 resting thereon is still visible, which is so narrow that it does not cover edge area 12' of cover plate 12.

To prevent a flow of tempering medium through openings 13 that are situated in edge area 12' of cover plate 12 and are not covered by material web 3, here as well shutoff device 2 having blocking element 20 is in its fully closed shutoff position, in which blocking element 20 is in contact with all four sealing lips 22. In this position of blocking element 20, a tempering medium flow through all the gaps between adjacent partition walls 14 is prevented and a tempering medium flow occurs only through openings 13, which are situated in the central region of cover plate 12, which region is covered by material web 3 and cannot be influenced by shutoff device 2.

Sealing lips 22 are designed, for example, as spring steel strips in order to ensure a good sealing effect in cooperation with wall-shaped blocking element 20.

With regard to the other parts of plate conveyor belt 1 shown in FIG. 3, reference is made to the description of FIG. 2.

Figure 4:
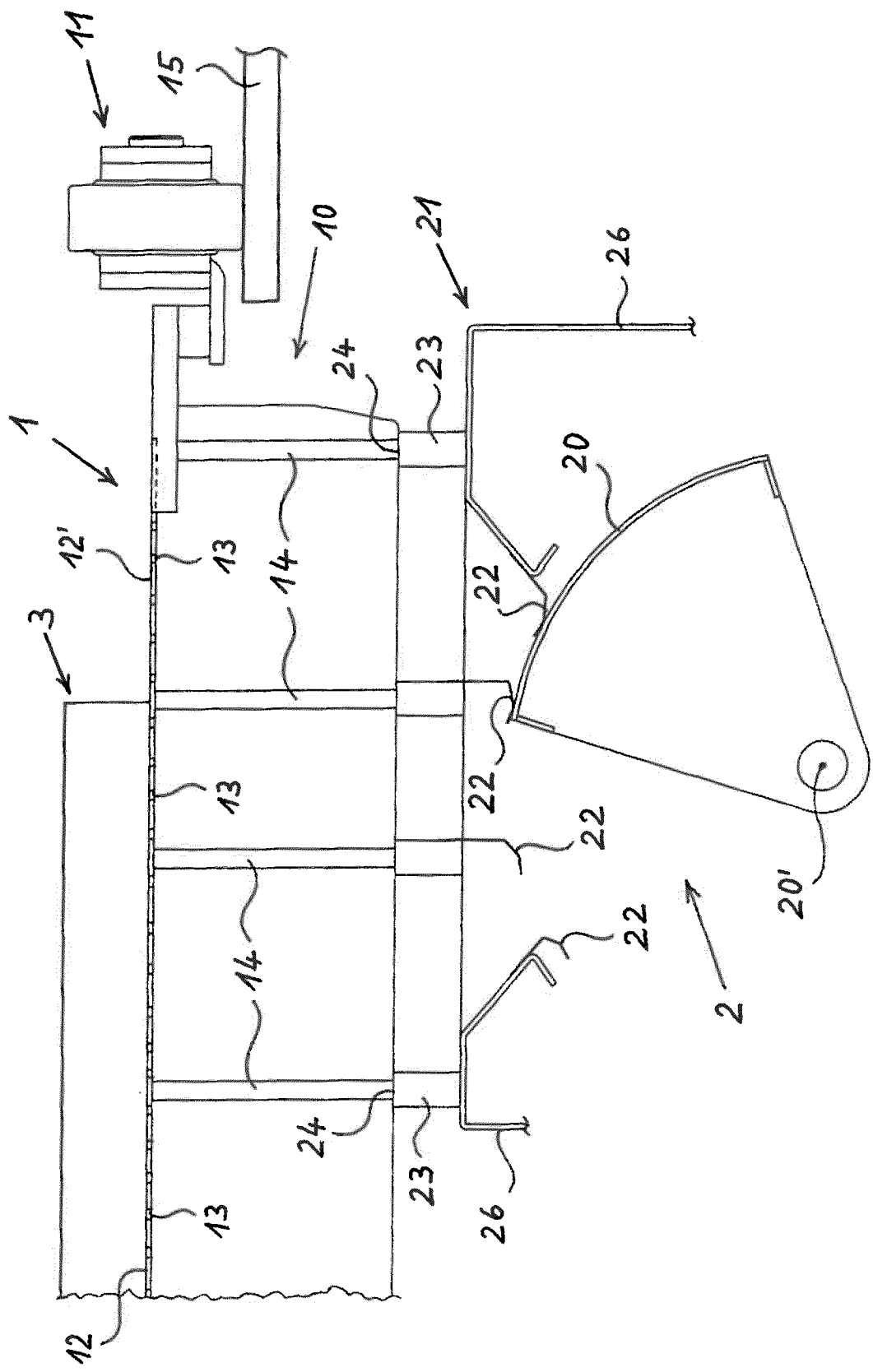
FIG. 4 shows the plate conveyor belt in a second operating state, in an enlarged schematic partial cross-section.

FIG. 4 shows plate conveyor belt 1 in a second operating state, in an enlarged schematic partial cross-section, again through the right edge region of plate conveyor belt 1 in FIG. 2.

As can be seen at the top of FIG. 4, a material web 3 having an increased width compared to FIGS. 2 and 3 is now lying on plate conveyor belt 1, so that material web 3 now extends up to second partition wall 14 seen from the outside, i.e., from the right in FIG. 4. So that the gaseous tempering medium can now also flow through the edge region of material web 3 in the desired manner, shutoff device 2 is brought into a partially open first opening position by pivoting blocking element 20 by a certain angle in the clockwise direction.

In this first open position of blocking element 20, this element remains in contact only with sealing lips 22 of the two outer partition walls 14, at right in FIG. 4, but no longer with sealing lips 22 of the two inner partition walls 14, at left in FIG. 4. This opens the path for a flow of tempering medium through the gaps between the three inner partition walls 14 (at left in FIG. 4), seen from the outside, i.e., here from the right, and through the openings 13 in cover plate 12 situated in the area of the walls. Thus, the gaseous tempering medium also flows through the edge region of material web 3 on cover plate 12, while the part of the edge region of cover plate 12 not occupied by material web 3 continues to be shut off against a flow.

The flow of the tempering medium through the central region of cover plate 12, which is situated to the left of the innermost (at far left in FIG. 4) partition wall 14, with openings 13 situated there, and through the part of material web 3 lying there, is not influenced and cannot be influenced by shutoff device 2.

Thus, blocking element 20, in the first open position it assumes here, prevents a leakage flow of tempering medium through the outermost (at far right in FIG. 4) gap between the two outer (at right in FIG. 4) partition walls 14 and through edge region 12', not covered by material web 3, of cover plate 12 and the openings 13 situated there.

At the opposite, left edge region of plate conveyor belt 1 (not visible in FIG. 4), second shutoff device 2 situated there is in a mirror-symmetrical position with respect to right shutoff device 2 shown in FIG. 4, due to the mutual movement coupling explained with reference to FIG. 2, with the result that at the second edge region of plate conveyor belt 1 there is a flow guide for the gaseous tempering medium that is mirror-symmetrical with respect to the first, right edge region of plate conveyor belt 1.

Figure 5:
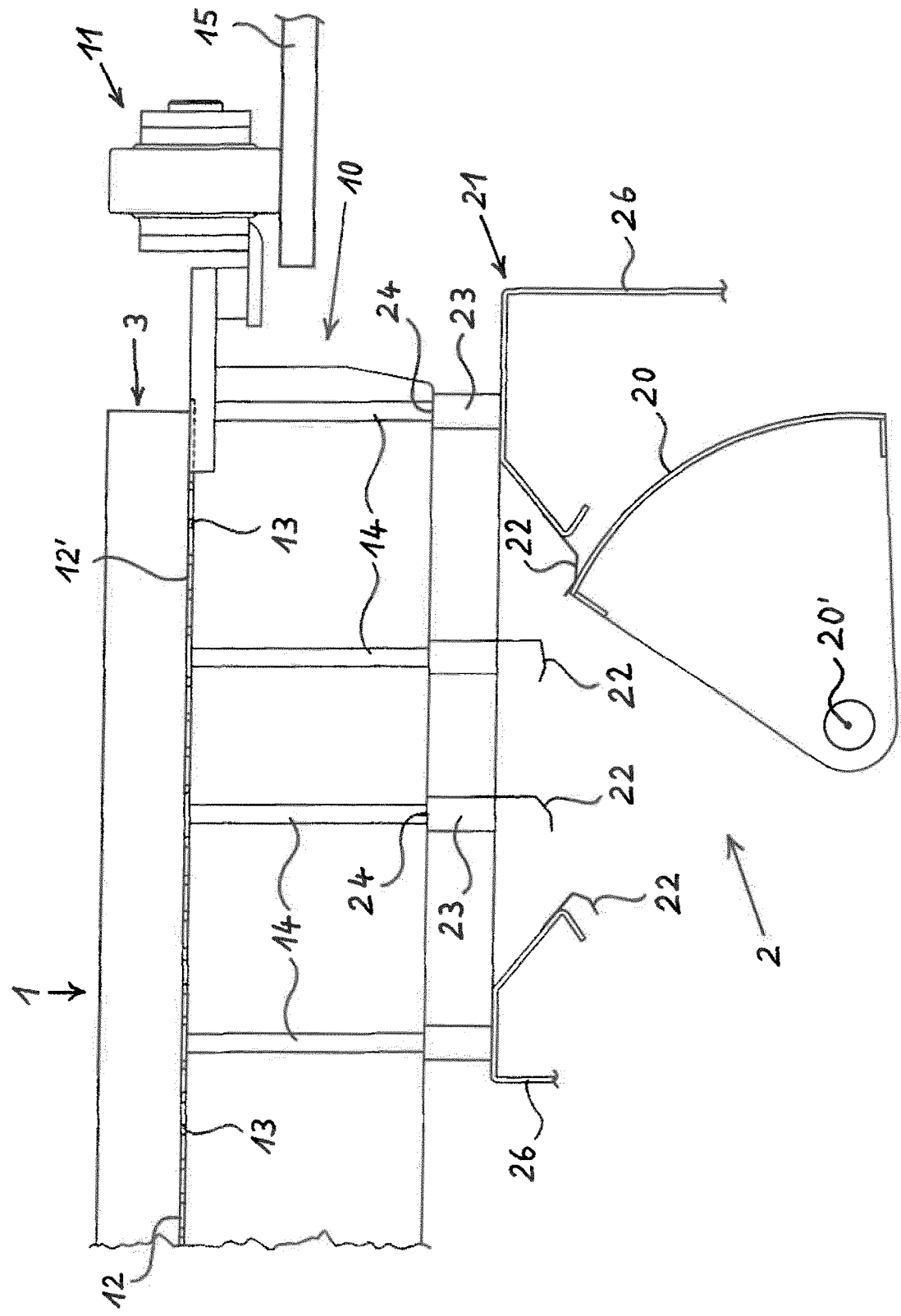
FIG. 5 shows the plate conveyor belt in a third operating state, in an enlarged schematic partial cross-section.

FIG. 5 shows plate conveyor belt 1 in a third operating state, also in an enlarged schematic partial cross-section through the edge region (the right edge region in FIG. 2) of plate conveyor belt 1.

As can be seen at the top of FIG. 5, a material web 3 having a width that has been enlarged again in comparison with FIGS. 2 through 4 is now lying on plate conveyor belt 1, so that material web 3 now extends up to the first, outermost partition wall 14 as seen from the outside, i.e., here from the right. The width of material web 3 shown here represents the maximum material web width that can be transported and treated on plate conveyor belt 1.

So that the gaseous tempering medium can now also flow through the edge region of material web 3 between the two outermost partition walls 14 in the desired manner, shutoff device 2 is brought into a second, fully open opening position by further pivoting of blocking element 20 by an additional angle in the clockwise direction.

In this position of blocking element 20, this element now remains in contact only with sealing lip 22 of the outermost, in FIG. 4 rightmost, partition wall 14, but no longer with sealing lips 22 of the three inner partition walls 14 (at left in FIG. 4). This opens the path for a flow of tempering medium through all the gaps between the associated partition walls 14 and through the openings 13, situated in their region, in cover plate 12. Thus, the gaseous tempering medium now also flows through the outermost edge region of material web 3 on cover plate 12.

The flow of the tempering medium through the central region of cover plate 12, which is situated to the left of the innermost (at far left in FIG. 5) partition wall 14, with the openings 13 situated there, and through the part of material web 3 lying there, is here again not influenced by shutoff device 2.

Figure 6:
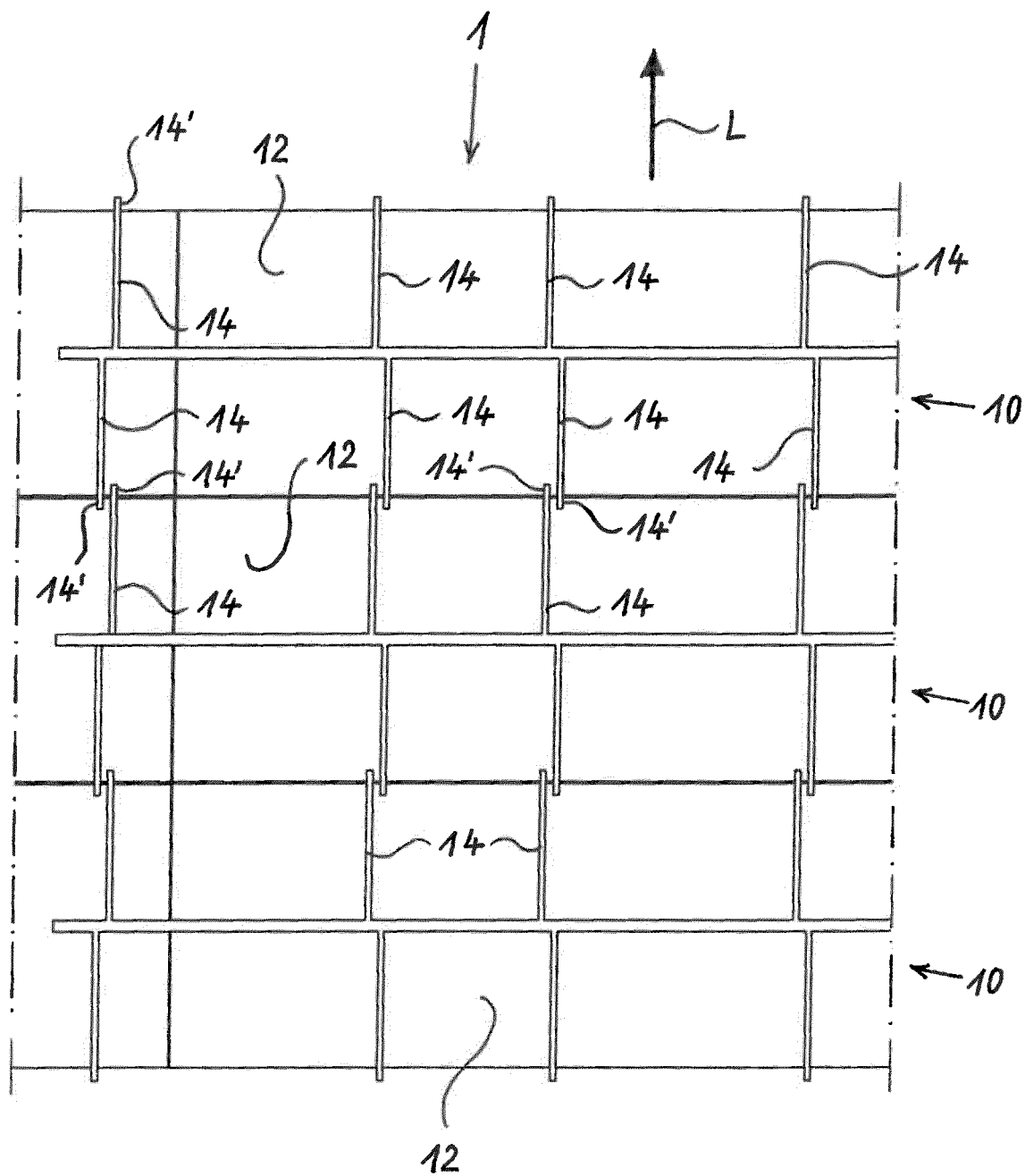
FIG. 6 shows a portion of the plate conveyor belt, in a bottom view.

Finally, FIG. 6 shows a portion of plate conveyor belt 1 in a bottom view; here shutoff device 2 is omitted and thus the view of the observer is directed to the underside of some (here three) adjacent conveyor belt segments 10 of plate conveyor belt 1.

Due to the direction of view in FIG. 6, the view is here also of the underside of partition walls 14, with which these walls slide over sliding surfaces 24 of sealing strips 23 of shutoff device 2 during operation of plate conveyor belt 1, as is visible in FIGS. 2 through 5. In addition, FIG. 6 shows that partition walls 14 are not realized in a continuous straight line, but each have a slight offset in their course, the dimension of which is slightly greater than the material thickness of partition walls 14.

In addition, partition walls 14, viewed in running direction L of plate conveyor belt 1, are somewhat longer than the respectively associated cover plate 12, as a result of which there is a degree of overlap of partition walls 14 of mutually adjacent conveyor belt segments 10 in the flat-running regions of plate conveyor belt 1, and thus there is also extensive gas-tightness against undesired passing through of the gaseous tempering medium at these locations.

The plate conveyor belt 1 according to the present invention is preferably provided for transporting a material web 3 through which a gaseous heating medium is to flow, as a tempering medium, in a furnace. Alternatively, however, a gaseous cooling medium can also flow through plate conveyor belt 1 as a tempering medium, in order to cool a material web 3 transported by plate conveyor belt 1, for example in a cooling section situated downstream from a furnace.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS 1 plate conveyor belt
10 conveyor belt segment
11 articulated connections on 10
12 cover plate
12' edge regions of 12
13 openings in 12
14 partition walls on 10
14' overlapping end regions of 14
15 conveyor belt frame
2 shutoff device
20 blocking element
20' pivot axis of 20
21 supporting frame of 2
22 sealing lips on 21
23 sealing strips on 21
24 sliding surfaces on 23
25 power drive for 2
25' coupling rod
26 heating medium conducting walls on 21
3 material web
L running direction of 1

The invention claimed is:

1. A plate conveyor belt for transporting a material web to be thermally treated in a continuous flow by a gaseous tempering medium, the plate conveyor belt comprising:
conveyor belt segments that are connected to one another in articulated fashion, each segment having a flat cover plate having a surface that forms a contact surface to the material web to be treated, and the cover plate having openings for conducting through the gaseous tempering medium conducted through the material web,
wherein the openings in the cover plate are provided in a configuration corresponding to a transport of a material web that has a width equal to a width of the plate conveyor belt, and
wherein, for a thermal treatment of a material web that is narrower than the width of the plate conveyor belt, at least along one longitudinal side of the plate conveyor belt, edge-side openings in the cover plates are configured to be blocked by a wall-shaped blocking element with respect to the conducting through of the gaseous tempering medium, the wall-shaped blocking element being impermeable to gas.

2. The plate conveyor belt according to claim 1, wherein along both longitudinal sides of the plate conveyor belt, edge-side openings of the cover plates can be blocked and opened by a respective wall-shaped blocking element with respect to the conducting through of the gaseous tempering medium, in accordance with a width of the material web to be thermally treated.

3. The plate conveyor belt according to claim 1,
wherein three or more partition walls running in a longitudinal direction of the plate conveyor belt are situated on each conveyor belt segment on its side facing away from the contact surface, at the left and at the right, and
wherein a shutoff device having the wall-shaped blocking element is assigned to at least two edge-side pairs of mutually adjacent partition walls, which element can be adjusted between a shutoff position and two or more opening positions for the gaseous tempering medium to be fed between the associated, mutually adjacent partition walls through the openings, situated between these partition walls, in the cover plates.

4. The plate conveyor belt according to claim 3,
wherein the shutoff device having the adjustable blocking element is situated in a stationary manner, and
wherein, at least in the shutoff position of the wall-shaped blocking element, the partition walls cooperating with the shutoff device run in a sealing manner over sliding surfaces of the shutoff device during operation of the plate conveyor belt.

5. The plate conveyor belt according to claim 4, wherein sealing strips having the sliding surfaces are situated in the shutoff device opposite the partition walls in the longitudinal direction of the plate conveyor belt, over which sealing strips the partition walls slide in a sealing manner during operation of the plate conveyor belt.

6. The plate conveyor belt according to claim 5, wherein the shutoff device has at least one supporting frame having tempering medium guide walls, which frame bears the sealing strips on its side facing the partition walls, and whose side facing away from the partition walls cooperates with the wall-shaped blocking element or the wall-shaped blocking elements.

7. The plate conveyor belt according to claim 6, wherein the wall-shaped blocking element is adjustable and readjustable in its position relative to the supporting frame.

8. The plate conveyor belt according to claim 6, wherein sealing lips are situated on the side of the supporting frame that cooperates with the wall-shaped blocking element or the wall-shaped blocking elements, which sealing lips, in the shutoff position of the wall-shaped blocking element or of the wall-shaped blocking elements, seal this element or these elements against the supporting frame.

9. The plate conveyor belt according to claim 4, wherein the shutoff device is adjustable and readjustable in its distance relative to the partition walls.

10. The plate conveyor belt according to claim 3, wherein the wall-shaped blocking element can be adjusted manually or by a power drive.

11. The plate conveyor belt according to claim 3, wherein the wall-shaped blocking element has the shape of a cylinder jacket segment and can be pivoted about its imaginary cylinder center axis as a pivot axis running in the longitudinal direction of the plate conveyor belt, between its shutoff position and one or more opening positions.

12. The plate conveyor belt according to claim 3, wherein partition walls adjoining one another of successive conveyor belt segments are formed having mutually overlapping end sections.

13. The plate conveyor belt according to claim 1, wherein openings in the cover plates are formed as at least one of round holes or elongated slots.

14. The plate conveyor belt according to claim 1, wherein the plate conveyor belt is configured to transport a mineral wool web containing binders that can be thermally cured by a gaseous heating medium through a curing furnace.

15. A furnace for a material web to be treated in a continuous flow by a gaseous tempering medium comprising
at least one plate conveyor belt for transporting the material web,
wherein the plate conveyor belt has the features of claim 1.

16. The furnace according to claim 15, further comprising two plate conveyor belts running parallel to one another at a distance from one another, the cover plates of which face one another in the conveyor belt strands accommodating the material web between them, and the distance between them being set or adjustable to a dimension corresponding to a desired thickness of the material web.

17. The furnace according to claim 15, wherein the furnace is configured to treat a mineral wool web containing thermally curable binders.

* * * * *